United States Patent [19]

Bruno et al.

[11] Patent Number: 6,160,837
[45] Date of Patent: *Dec. 12, 2000

[54] METHOD OF AVOIDING NEAR-FAR INTERFERENCE PROBLEMS IN AN ARRAY OF NAVIGATION SIGNAL BEACONS HAVING SELECTED CDMA OR GPS-LIKE NAVIGATION SIGNALS

[75] Inventors: Ronald Bruno, Arlington, Va.; Leonard Schuchman, Potomac, Md.; Lloyd Engelbrecht, Reston, Va.

[73] Assignee: ITT Manufacturing Enterprises, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/754,406

[22] Filed: Nov. 21, 1996

Related U.S. Application Data

[62] Division of application No. 08/363,773, Dec. 23, 1994, Pat. No. 5,604,765.

[51] Int. Cl.[7] ............................................ H04B 1/69
[52] U.S. Cl. ............................ 375/130; 370/320; 370/330
[58] Field of Search .................................... 375/200, 130; 370/319, 320, 321, 330, 335, 336, 337, 342, 344, 347, 436, 478; 455/256, 257, 63; 342/386, 419

[56] References Cited

U.S. PATENT DOCUMENTS

| | | | |
|---|---|---|---|
| 5,412,658 | 5/1995 | Arnold et al. | 370/330 |
| 5,510,979 | 4/1996 | Abraham et al. | 455/456 |
| 5,586,167 | 12/1996 | Handforth | 455/456 |
| 5,600,706 | 2/1997 | Dunn et al. | 455/456 |
| 5,708,969 | 1/1998 | Kotzin et al. | 455/63 |

*Primary Examiner*—Don N. Vo
*Attorney, Agent, or Firm*—Jim Zegeer

[57] ABSTRACT

A method of avoiding near-far interference problems in a cellular ray of navigation signal beacons having selected CDMA or GPS-like navigation signals. The navigation signals from adjacent navigation signal beacons are pulsed so that adjacent navigation signal beacons do not broadcast navigation signals simultaneously and the multiple frequencies are coordinated in a time divisional multiplex manner. In another aspect, the near-far interference problem is avoided by using multiple frequencies in time division multiplexing and coordinating the use of the multiple frequencies and the time division multiplexing to assure avoidance of the near-far interference problem.

1 Claim, 11 Drawing Sheets

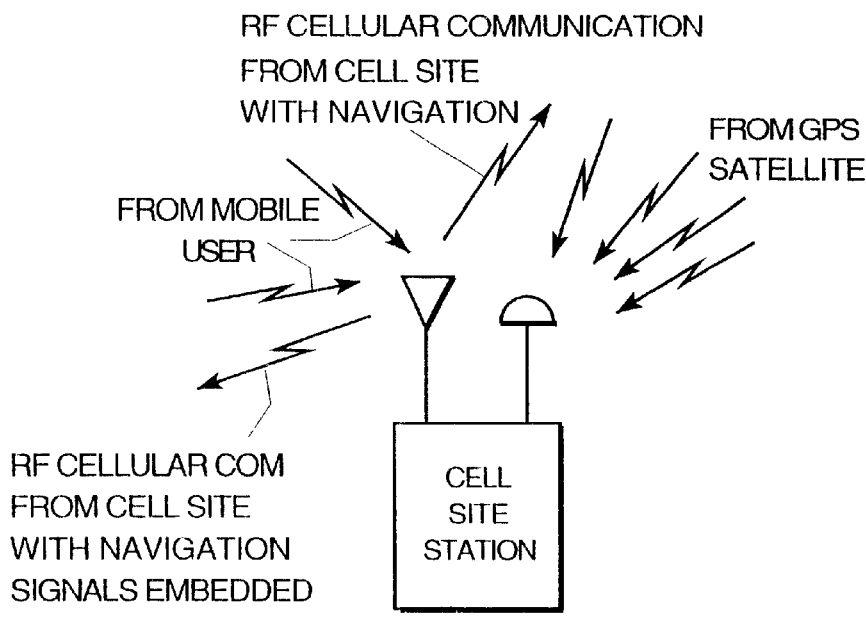

FIG. 1

Out of Cellular Range
GPS Position Fixing: works where there is a clear unobstructed view of the sky

Within Range Cellular of Cellular or Other Commmunications System
GPS-like RF signals in the cellular freqeuncy band will provide positioning wherever cellular works, including the indoors

For 3D Position Accurate to Floor Level
GPS Signposts: works in a building to provide the signpost ID which maps to floor level, address etc.; requires low power GPS-like broadcasts at selected checkpoints which convey the ID of that checkpoint in the broadcast data

FIG. 2

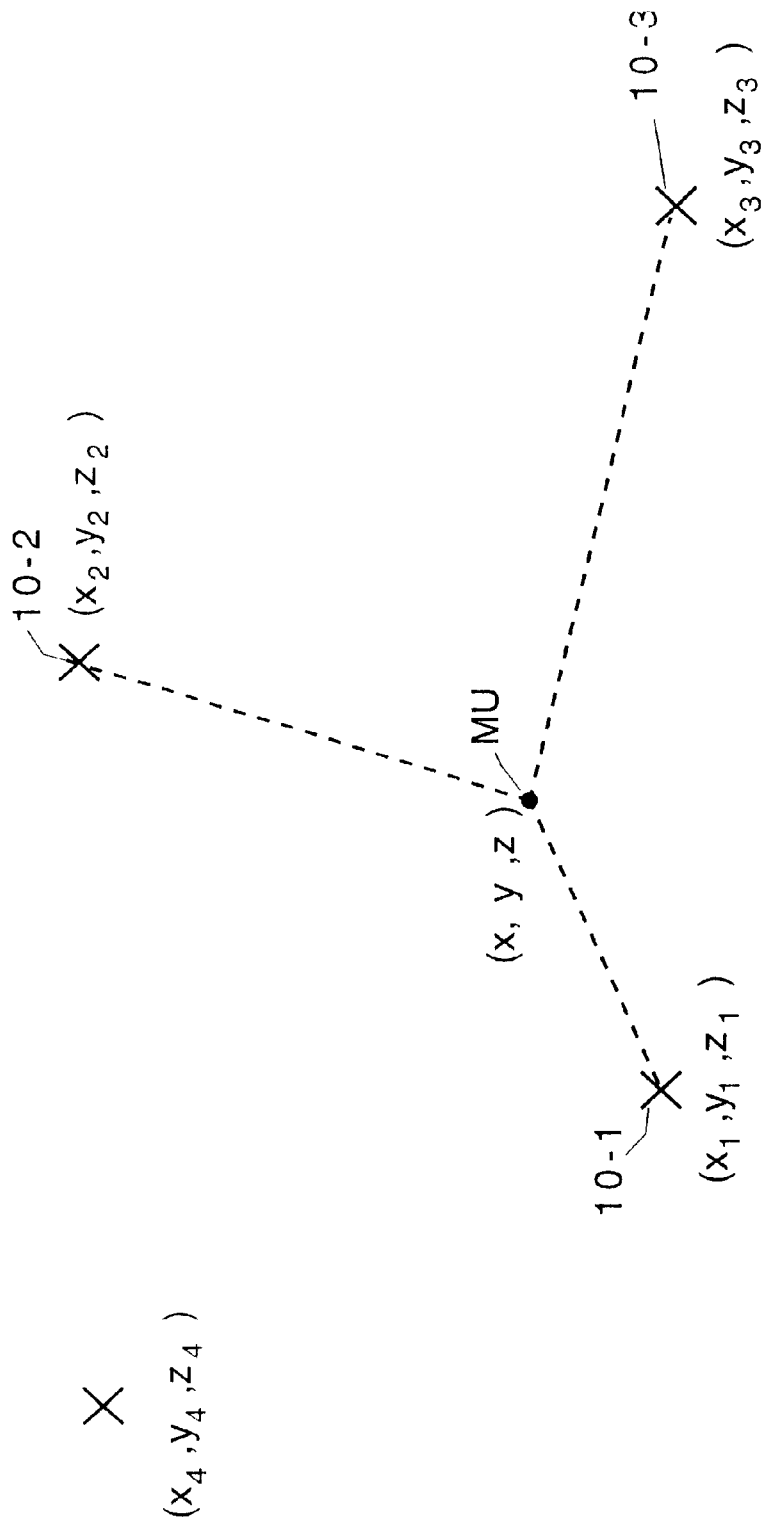

METHOD OF AVOIDING NEAR-FAR INTERFERENCE PROBLEMS IN AN ARRAY OF NAVIGATION SIGNAL BEACONS HAVING SELECTED CDMA OR GPS-LIKE NAVIGATION SIGNALS

This is a divisional application of application Ser. No. 08/363,773, filed Dec. 23, 1994 now U.S. Pat. No. 5,604, 765.

BACKGROUND OF THE INVENTION

Wireless communications are rapidly augmenting conventional telephone communications. In conventional telephone communications, emergency 911 service has been in existence for a number of years and has evolved and been upgraded over time. Currently, from most wired telephone systems, an "Enhanced 911" service is available. In Enhanced 911 service, the emergency center receiving the call automatically learns the phone number, location and identity of the calling party. Such information is necessary for rapidly dispatching the required help to the correct location, and for call-back to the party that reported the emergency, if required. Indeed, Enhanced 911 is so common, that there is an expectation and assumption by the public, that such service is available in the wireless world. However, at the current time, Enhanced 911 service does not exist for cellular telephony which is the most mature wireless communication system in the United States. At the current time, an emergency center that receives a call dialed from a cellular telephone, has no idea where the party is calling from and does not know the phone number or identity of the phone subscriber. Furthermore, there exists no infrastructure or standard for providing Enhanced 911 service in cellular and other wireless communications systems. Determining the position of the calling terminal making a wireless call is a key requirement for providing Enhanced 911. A number of alternatives for determining position of a caller are based upon the calling terminal estimating its position with the support of auxiliary equipment and/or the use of broadcast RF beacons. Available options for position location at the calling terminal are as follows:

1. Broadcast Navigation RF Beacons: GPS and Loran are two examples.
2. Commercial Broadcasts as Navigation Beacon Surrogates: such as using the broadcasts of AM, FM or TV for determining position. (See, for example, U.S. Ser. No. 08/203,257, and PCT Application Ser. No. PCT/US93/12179, incorporated herein by reference)
3. Base Station to Mobile/Portable Terminal Broadcasts as Navigation Beacon Surrogates: such as using the broadcasts from multiple cellular base stations.
4. Dead Reckoning and other forms of Inertial Navigation: such as using the speedometer output of a vehicle in combination with a gyroscope to detect turns.

Because of the variety of wireless environments and services, none of these options provides a universal solution for determining position of the calling terminal. For example, in the cellular world, there are two distinctly different environments for mobiles and portables. Mobile terminals are defined as those that are installed in and operate from vehicles. Thus the locations for the mobile environment are restricted to places that a vehicle may go. Portable terminals are defined as hand-held devices and so portables will be used anywhere that a person may go with or without a vehicle. Thus mobiles and portables are different insofar as the places that they are required to operate in. Mobiles must work primarily on streets and highways where there is often a clear view of the GPS constellation; and when there is not, such as in the "urban canyon," GPS position fixing is still possible, albeit on an interrupted basis. Portables however, will be used inside buildings, shopping malls, and parking garages where cellular communications signals penetrate, but GPS signals do not. Furthermore, mobiles (unlike portables) are not particularly constrained with respect to size and power; thus, the vehicle that hosts the mobile can support the power required for continuous position fixing; they can support the equipment needed for dead reckoning; and finally, they provide a platform on which to attach antennas (i.e., GPS) that must be mounted in a fixed orientation.

DESCRIPTION OF THE INVENTION

The object of this invention is to provide a system with world-wide capability for position determination via broadcast of RF navigation signals.

The overall system comprises the following three elements: 1) the GPS system, 2) GPS-like signals broadcast at an alternative frequency, and 3) GPS-like RF signposts.

The first element of the system, GPS, provides worldwide positioning as long as the view to the GPS constellation is not obstructed. With GPS, a receiver determines its position by measuring the pseudorange of spread spectrum signals broadcast by the GPS satellites at 1575.42 MHz.

The second element is the novel concept embedding GPS-like signals within the communications bandwidth of a wireless communications systems. This is similar to the concept of GPS pseudolites that have been proposed for aviation navigation, but the navigation signals proposed here are not at GPS frequencies.

Rather they are at and share the same bandwidth with communications frequencies. The concept is flexible so that a variety of existing communications systems can have embedded navigation signals. Because of its widespread implementation, the US cellular telephone system is a particularly attractive environment for embedding navigation signals. However, the concept of embedded navigation signals applies to digital TDMA and CDMA cellular, GSM, and emerging systems in the PCS bands as well as those that operate in the ISM bands. The position determination supported by this second element serves as a supplement or replacement of the GPS system in any region or environment that is covered by that wireless communication system. This includes the urban canyon, but also indoor environments such as shopping malls and buildings which are serviceable by cellular telephone and other wireless communications systems. In this second element, a GPS-like receiver in the mobile/portable communications transceiver makes pseudorange measurements on the broadcast sources and calculates the position of the receiver from these measurements. The operation of this system is described below.

The third element is another novel concept that involves the use of GPS-like RF broadcasts that mark the location of the broadcast. The range of this broadcast is designed to be short ($\approx 100$ feet) so that the mere reception of this broadcast and reading the data location marker in the signal determines the position of the receiver to within 100 ft. These broadcast signals are referred to as RF Signposts. RF Signposts can be used indoors and can successfully convey address and floor of a building or locations in a shopping mall, etc., while ranging systems that are inherently corrupted by severe multipath in the indoor environment cannot.

DESCRIPTION OF THE DRAWINGS

The above and other objects, advantages, and features of the invention will become more apparent when considered with the following specification and accompanying drawings wherein:

FIG. 1 is a block diagram of a cellular base station having incorporated therein a navigation signal generator, FIG. 2 is a diagram depicting the overall system for seamless and comprehensive position locations, FIG. 3 is a diagram illustrating a mobile terminal taking pseudorange measurements to three cellular telephone base stations.

DETAILED DESCRIPTION OF THE INVENTION

GPS-like Signals Embedded Within Wireless Communications Systems Application Ser. No. 08/203,257 discloses the use of commercial radio and TV broadcast signals to supplement or even replace GPS positioning in environments where the GPS signals are frequently blocked, or do not penetrate at all. The present invention incorporates another alternative for supplementing or replacing GPS that involves adding a GPS-like navigation signal to the communications broadcasts from cellular and other wireless base station transmitters. As will be shown below, the navigation signal may simultaneously reside in the same frequency band that is used to carry the communications channels. As will be described herein, it is possible to set the navigation (location or position) signal low enough to have no interference impact on the communications, while at the same time, be high enough to be detected, tracked, and support a data rate of 50 bps. Like GPS, the proposed navigation signal is a direct sequence spread spectrum waveform with a chipping rate of 1.023 Mcps and thus occupies a bandwidth (null to null) of about 2 MHz. The chipping phase would be synchronized to a uniform time base and, preferably, is slaved to the GPS system (see FIG. 7). The information payload of 50 bps would include such data as the position of the broadcast tower, time markers, and ancillary data to correct phase and frequency offsets of the signal.

The system concept is illustrated in FIG. 3 which shows a mobile user MU enclosed or bounded within 3 base stations 10-1, 10-2, 10-3 of a cellular communications system. At any point in time, the mobile unit MU tracks the navigation signals from at least 3 base stations and measures the pseudorange to each of them. Measurements from three base stations are required for a 2D solution and if a 3D solution is desired, then measurements from 4 base stations are required. For the 2D case this may be understood as follows:

3 Measurements result in three equations that embody the range from the mobile to the base station; these three equations are:

$$PR_1 = \sqrt{(x_{1-x})^2 + (y_{1-y})^2} + c\Delta$$

$$PR_2 = \sqrt{(x_{2-x})^2 + (y_{2-y})^2} + c\Delta$$

$$PR_3 = \sqrt{(x_{3-x})^2 + (y_{3-y})^2} + c\Delta$$

The $PR_i$ are the values of the 3 pseudorange measurements, the $x_i, y_i$ are the 2D coordinates of the 3 base stations, and c is the speed of light.

Each equation shares 3 common unknowns: the x,y coordinates of the mobile, and the uncertainty in the time of measurement ($\Delta$).

Thus the 3 equations are sufficient to solve the 3 unknowns that determine the position and time offset of the mobile. The algorithm for a 3D solution is a simple generalization of the 2D algorithm.

GPS-Like RF Signposts

Figure 8A:
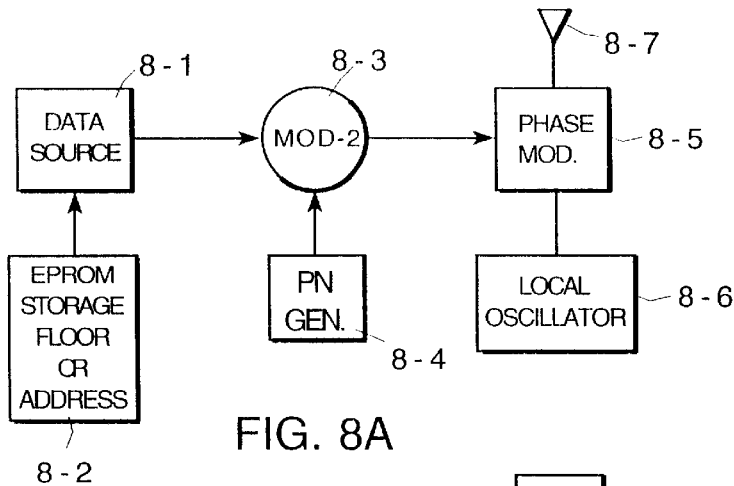
FIG. 8a is a block diagram of a low power RF position signpost.
Figure 8C:
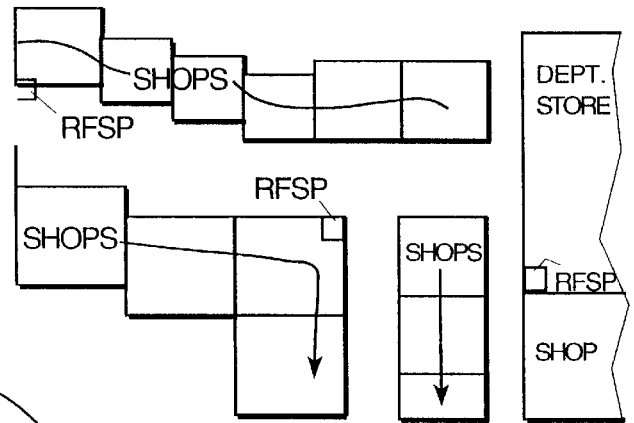
FIG. 8c is a diagrammatic layout of a large shopping mall or center where the RF position signposts are distributed at fixed locations.
Figure 8B:
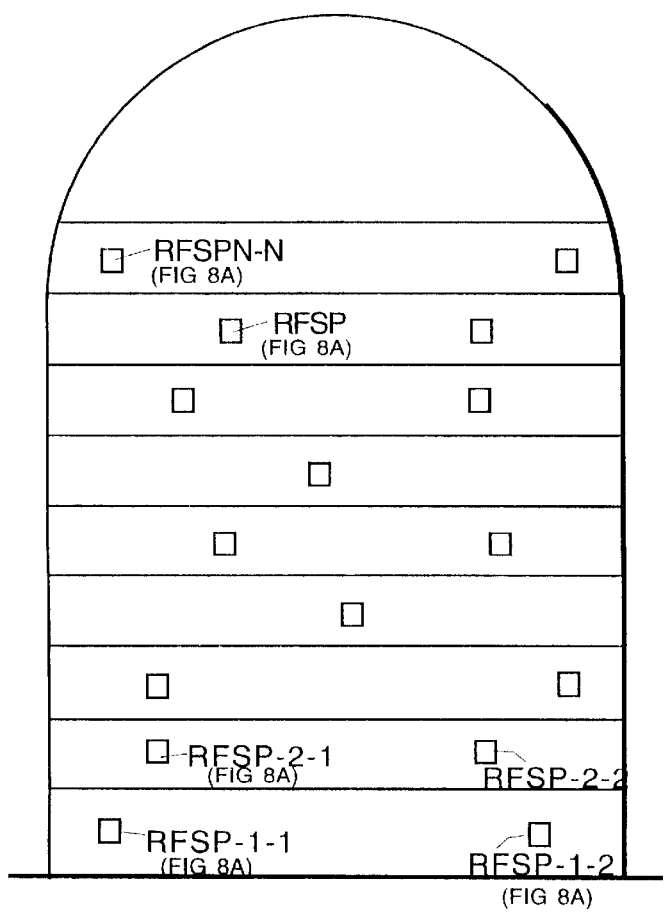
FIG. 8b is a diagrammatic layout of a large building in which the position signposts are distributed.

Like GPS, the RF Signpost navigation signal of this invention is a direct sequence spread spectrum waveform with a chipping rate of 1.023 Mcps and thus occupies a bandwidth (null to null) of about 2 MHz. The chipping phase would not have to be synchronized with any time base so that the cost of an RF Signpost would be very low. As shown in FIG. 8a, the data source 8-1 supplied with position or location information (floor, shops, wing. etc. of a building, or walkway, shops, etc. and direction in a shopping mall) is stored in an EPROM 8-2 or other data storage device encoded 8-3 with a PN code 8-4 and phase modulator 8-5 on a carrier 8-6, and broadcast at very low power by antenna 8-7. The information payload of 50 bps would include, at a minimum, data that conveys the position of the signpost. The position data would include a signpost ID which would map to an address based position (e.g., 100 Simeon Way, 10th floor, suite #1024) and possibly also to a 3D coordinate position. The RF Signposts are of sufficiently low power so that they have a very limited range. The transmission of a Signpost ID would convey the fact that the mobile/portable terminal is within some 100 feet or so of the signpost. The frequency of the RF Signpost broadcast is flexible. In the indoors, the Signposts could actually be at the GPS frequency w/o causing interference to the signals broadcast by the GPS constellation. Signposts can also broadcast at the communications frequencies (of cellular and PCS systems) as well as at ISM frequencies. In addition, Signposts may also be broadcast in signal structures that are different from that of GPS.

Interference Analysis of Embedded Navigation Signals

This section illustrates how navigation signals may be embedded under the communications signals of a communications system without causing any significant mutual interference between the two signals. In FIG. 4, the analysis is shown for broadcasts from a single source. In FIG. 6, the interference analysis is expanded to include broadcasts from multiple base stations within a cellular system. In this discussion, the AMPS cellular telephone communications system is assumed, but the methodology and results are applicable to any similar communications system, both analog and digital. In fact, the invention will work whenever the following constraint can be obeyed:

Spreading Gain>$SNR_C \cdot SNR_N$

Where the spreading gain applies to the embedded SS navigation signal (=43 dB=100 Mcps/50 bps) and $SNR_C$ and $SNR_N$ are the desired signal to noise ratios for the communications and navigation signals, respectively.

Navigation and Communications Broadcasts from a Single Common Base Station

In order to support the required pseudorange measurements, the navigation signals must be broadcast at a level such that the signal to noise ratios (SNR) of the communications channels are not affected, but the SNR of the navigation signal is sufficient to support 50 bps. In this discussion, the noise term in the SNR is assumed to include interference terms as well as contribution from thermal noise. Below, an interference analysis between communications and navigation signals in a cellular communications system is described.

Consider a wireless cellular communications base station that broadcasts a number of communications channels that are separated by frequency. The communications broadcasts from this system are as follows:

$B_C$=the bandwidth of the communications channels $E_C$=signal strength of a single communications with bandwidth $B_C$ $I_C$=Interference to $E_C$ from other communications channels of the system; this includes:
adjacent channel interference from signals broadcast by the cell site base stations and from signals broadcast by other cell site base stations.
co-channel interference from signals broadcast by other cell site base stations.

For a system in which the receiver noise density is given by $N_0$, the signal to noise for the communications signal is given by:

$$\left(\frac{S}{N}\right)_{Comm} = \frac{E_C}{I_C + N_0 B_C}$$

In typical cellular environments, the communications signal to noise is typically 18 dB or greater in order to support good voice quality. This is illustrated in the signal level diagram in FIG. 4a. Now imagine an additional navigation signal with an energy $E_N$ that is spread across M communications channels. In such a case the signal to noise ratio of the communications signals are degraded slightly as follows:

$$\left(\frac{S}{N}\right)_{Comm} = \frac{E_C}{E_N/M + I_C + N_0 B_C}$$

Figure 4A:
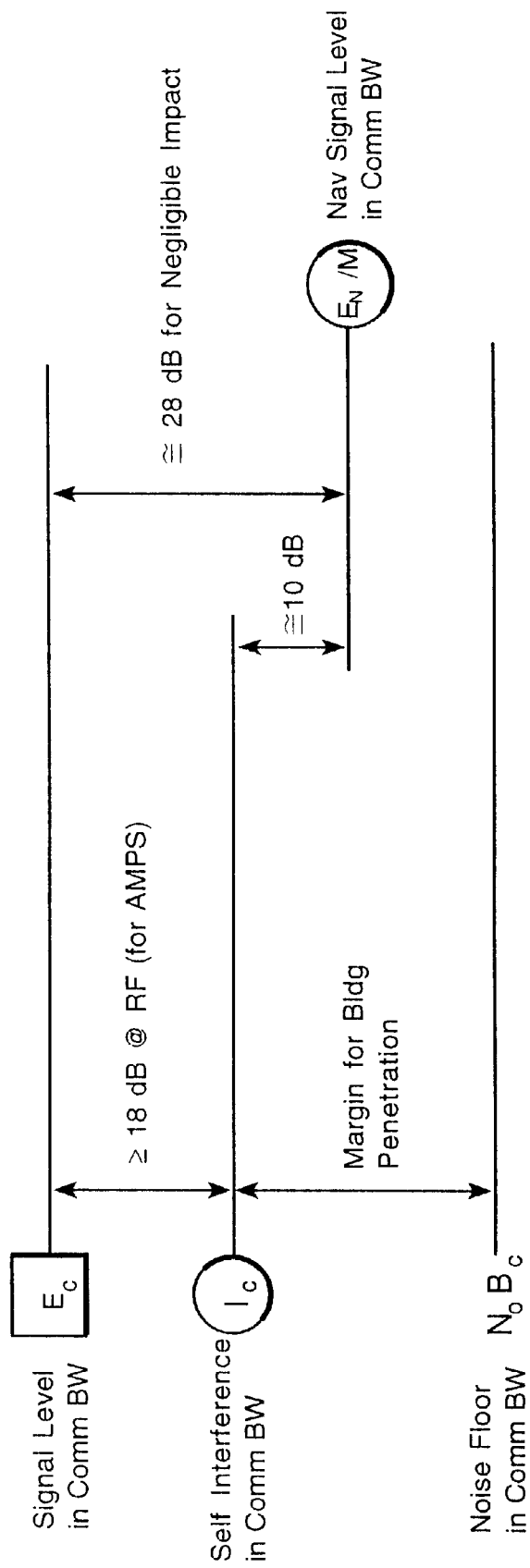
FIG. 4a is a diagrammatic analysis of the impact of a spread spectrum navigation signal on the signal-to-noise ratio (SNR) of a conventional communications signal.

However, as indicated in FIG. 4a, it is proposed that the level of $E_N/M$ be set 10 dB below the level of $I_C$ (or 28 dB below $E_C$) so that the impact of a navigation signal on the communications signal to noise ratio is negligible.

While, the impact of the navigation signal is negligible, the set magnitude of $E_N$ is sufficiently high so that the signal to noise ratio of the navigation signal can support a 50 bps data rate. The navigation signal to noise may be derived by noting that the sum of the communications signal energy and interference ($E_C+I_C$) divided by the communications bandwidth ($B_C$) acts as an additional term to the noise spectral density. Thus the signal to noise density of the navigation signal to noise ratio is as follows:

$$\left(\frac{S}{N}\right)_{Nav} = \frac{E_N}{[(E_C + I_C)/B_C + N_0]B_N}$$

where $B_N$ is the noise bandwidth associated with the 50 bps data rate of the navigation signal. As seen in FIG. 4a, $E_C$ dominates $I_C$ so that the navigation SNR is very nearly approximated as follows:

$$\left(\frac{S}{N}\right)_{Nav} = \frac{E_N}{[E_C/B_C + N_0]B_N}$$

Figure 4B:
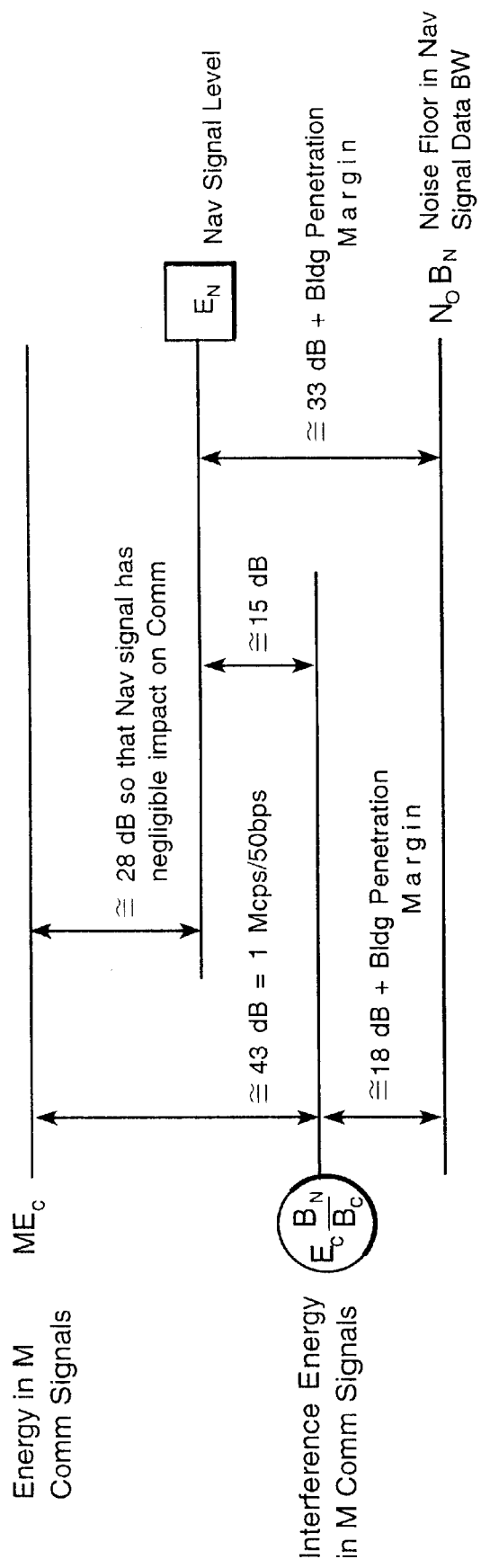
FIG. 4b is a diagrammatic analysis of the impact of a set of communication signals on the SNR of a navigation signal.

As illustrated, in FIG. 4b, for the set of assumed parameters, this signal to noise ratio is 15 dB and thus is easily able to support reliable data transfer. In addition, it is significant to note that the navigation signal is 15 dB higher than the communications signals are above their respective thermal noise floors. Thus the navigation signals should have the same or better margin for building penetration as the communications signals.

Interference Among Broadcasts within a Cellular System

Figure 5:
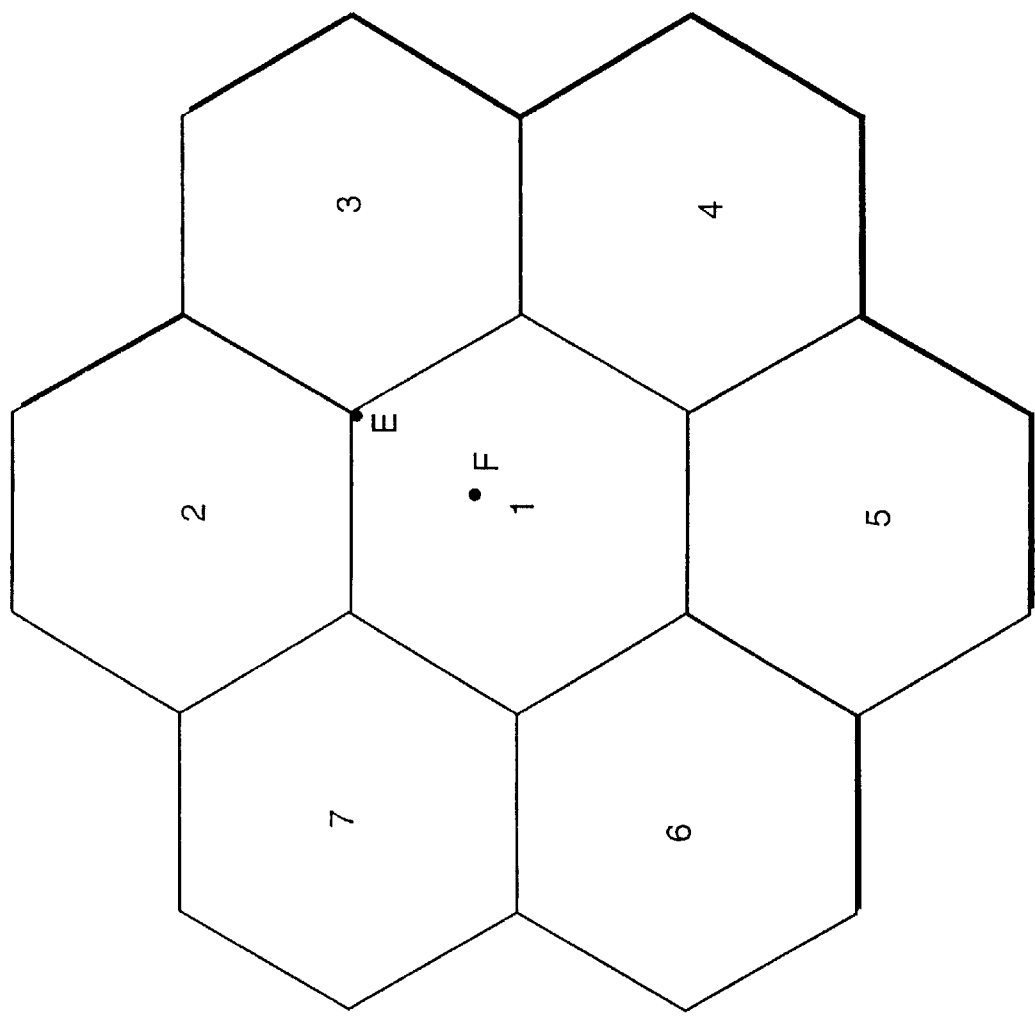
FIG. 5 is an illustration of a mobile terminal in a 7-cell cluster of a cellular communication system.

In FIG. 5, the geometry and interference scenarios among broadcasts from a cluster of 7 adjacent base stations 5-1, 5-2, 5-3, 5-4, 5-5, 5-6, and 5-7 are illustrated. It is assumed that each base station uses roughly 1/7 of the allocated spectrum and that the channels used by each base station are distributed throughout the spectrum. This assumption is roughly consistent with channel assignment in the current AMPS cellular telephone system. Thus within the 2 MHz of the navigation signal, each base station transmits communications signals on 1/7 of the spectrum. The interference analysis is considered at two positions: E and F. The analysis at point E is a worst case for the interference impact of the navigation signals on the communications signals and it determines the relative level that the navigation signals must be set at. The analysis at point F is a worst case for the interference impact of the communications signals have on the navigation signal.

At point E which is midway between 3 base stations, there are 3 navigation signals of equal strength converging there. If we assume that all navigation signals share the same frequency, then these 3 signals interfere with a communications channel within the 2 MHz band. In this environment, the SNR of a communications signal is as follows:

$$\left(\frac{S}{N}\right)_{Comm,\varepsilon} = \frac{E_C}{3E_N/M + I_C + N_0 B_C}$$

Figure 6A:
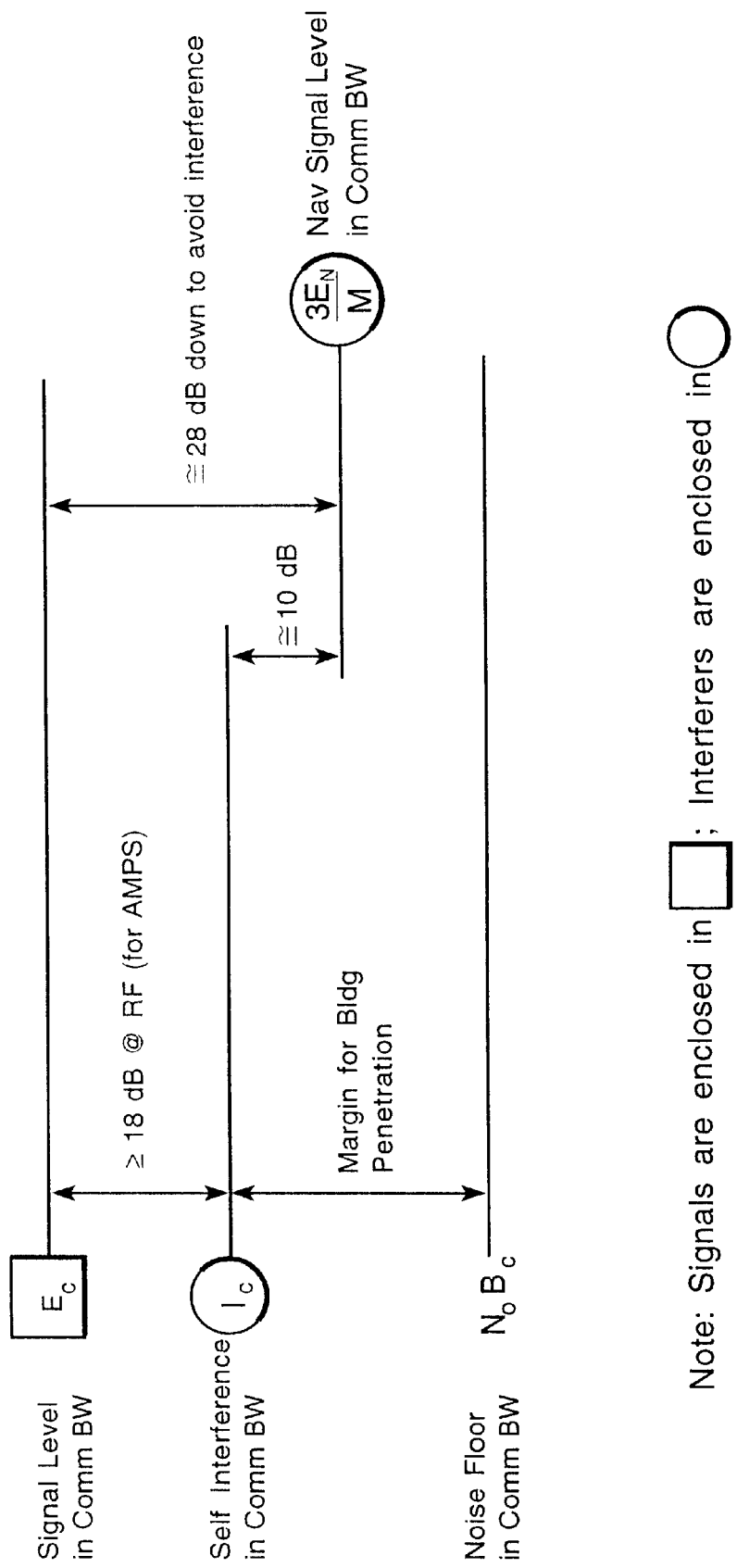
FIG. 6a is an analysis of the impact of navigation signals on the SNR of a communications signal with the mobile unit being located at Point E in FIG. 5.

If the strength of the navigation signals are set (as indicated by "set level" in FIG. 7) so that the combined interference from the 3 signals is 28 dB below the energy in a communications channel, the navigation signals will not have any significant degrading impact on the communications. This is illustrated in FIG. 6a.

Figure 6B:
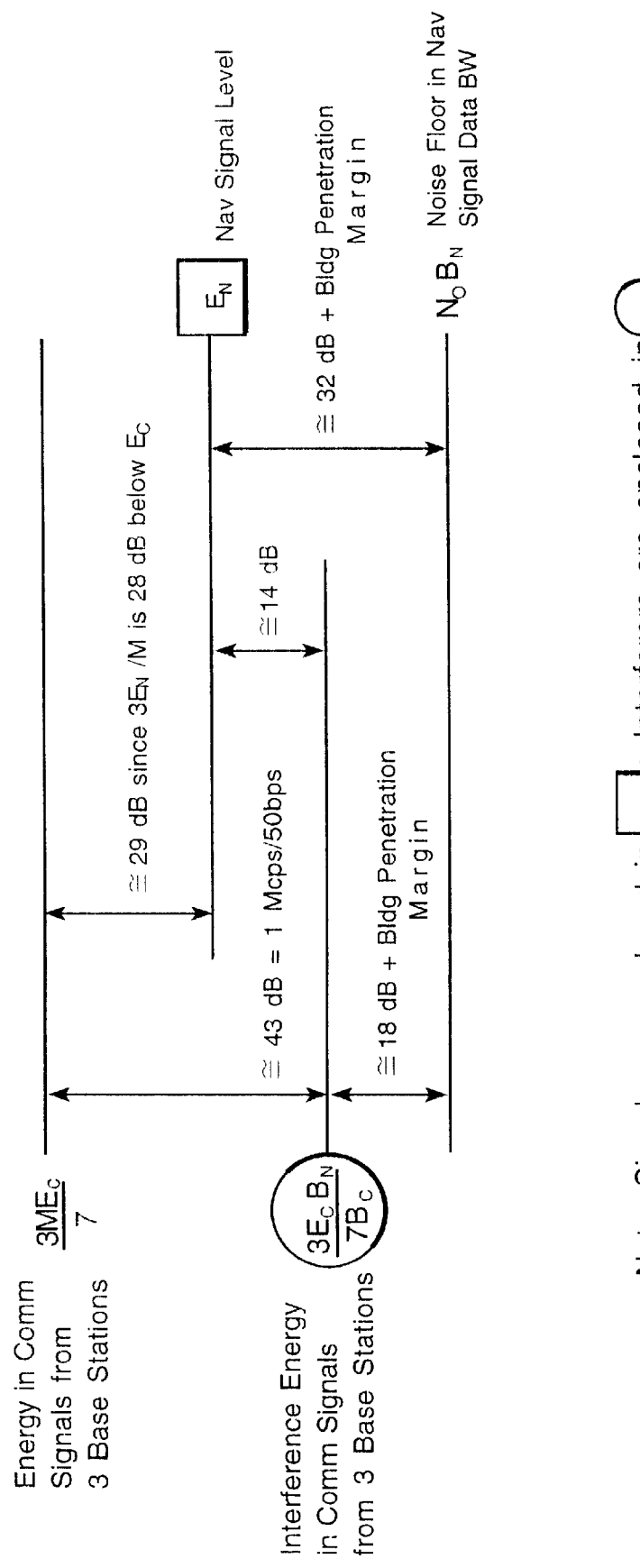
FIG. 6b is an analysis of the impact of the communication signals on the SNR of a navigation signal when the mobile unit is located at Point E in FIG. 5.

In FIG. 6b, the interference analysis at point E of the communications signals on the navigation signals is illustrated. In this case, we assume that the three surrounding base stations have communications channels that occupy 3/7 of the 2 MHz band. Thus the navigation SNR is as approximately expressed as follows:

$$\left(\frac{S}{N}\right)_{Nav,E} = \frac{E_N}{[3E_C/7B_C + N_0]B_N}$$

Then since, $3E_N$ is set 28 dB below $E_C$, it follows that $E_N$ is 29 dB below $(3/7)M\ E_C$. With a spreading gain of 43 dB, it follows that the SNR of the navigation signal is 14 dB since the contributions to interference from other terms are negligible.

Figure 6C:
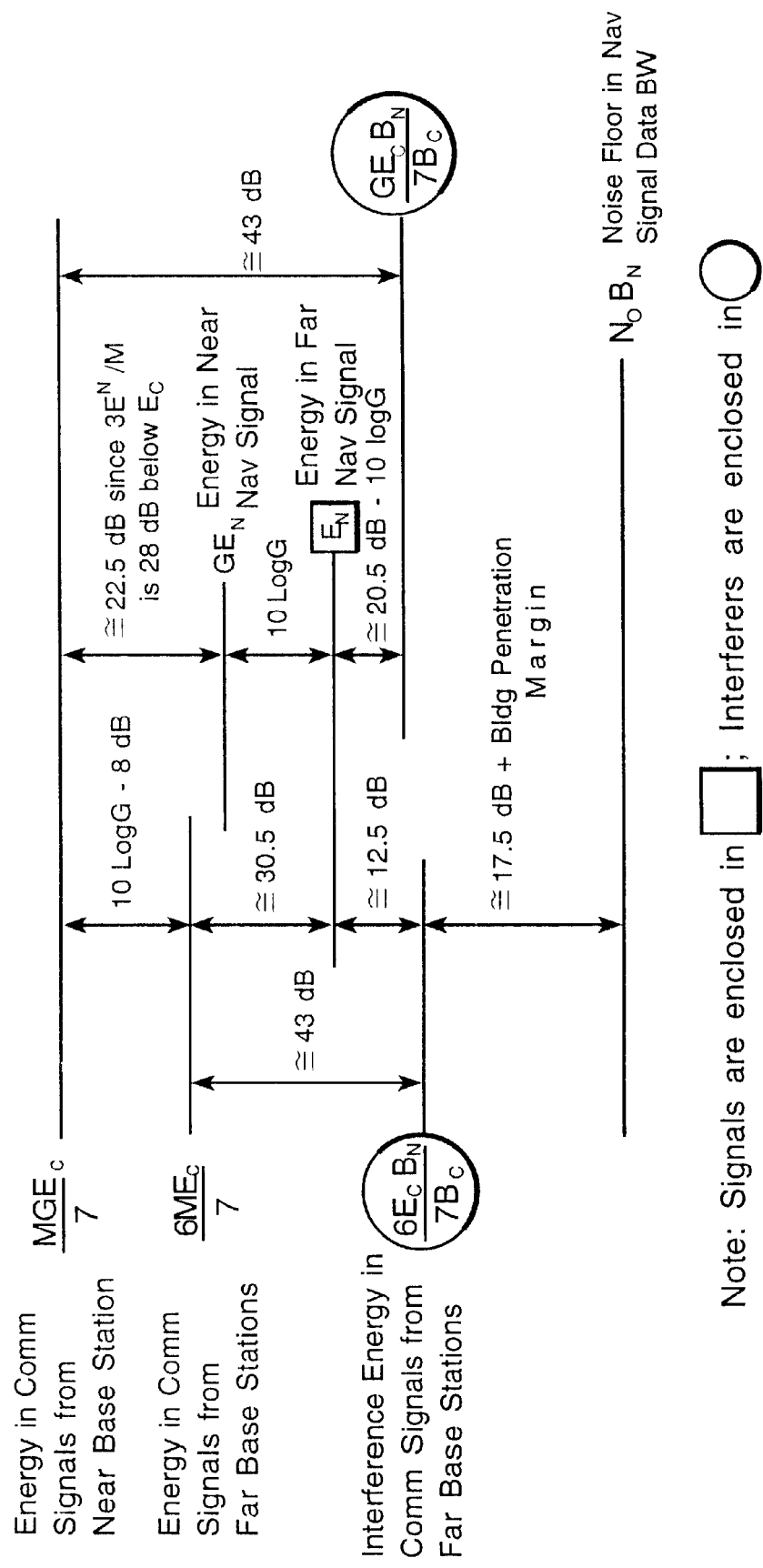
FIG. 6c is an analysis of the impact of a navigation signal from a far base station with the mobile unit at Point F in FIG. 5.

At point E, all the signals are equidistant from the base stations, so that there is no range loss differential to consider. However, when the mobile is at point F it is very close to base station #1 and the range loss differential between the signals broadcast by #1 vs the 6 adjacent base stations can be quite large. In this case, the energy of the communications signals broadcast from base station #1 are far stronger than the interfering navigation signals so that there is no significant interference impact of the navigation signals on the communications signals. FIG. 6c shows the results of the interference analysis of the communications signals on the navigation signals when the mobile is at point F. In particular, this shows the analysis for receiving a navigation signal that is transmitted by one of the adjacent base stations that is relatively far away and therefore suffers a range loss. In this simplified analysis, the range loss differential is accounted for by adding a gain coefficient G on all the signals broadcast by base station #1. There are 3 sources of potentially significant interference to consider for a navigation signal broadcast by an adjacent base station:

1. The communications signals from the 6 adjacent base stations.
2. The communications signals from base station #1.
3. The navigation signal from base station #1.

The SNR of the navigation signal considering these interference sources are as follows:

$$\left(\frac{S}{N}\right)_{Nav,F} = \frac{E_N}{[(6E_C/7 + GE_C + GE_N/M)/B_C + N_0]B_N}$$

With respect to the first source, the adjacent stations are assumed to occupy 6/7 of the 2 MHz navigation signal bandwidth. FIG. 6c indicates that the SNR between this and navigation signal and this source is 12.5 dB.

With respect to the second interference source, it is seen that the SNR is about 20.5 dB-10 logG. This term is clearly problematic since it says that whenever G is as large as 10, the SNR is less than 10 dB and we cannot operate reliably. In typical cellular systems, the differential range losses are much larger than 10. This would mean that whenever the mobile was close to a base station, the navigation signals of the adjacent stations would be jammed and only the local navigation signal could be received. This interference situation can be significantly ameliorated if the local navigation signal broadcasts the channel numbers of the occupied communications frequencies. Then, the mobile receiver for the navigation signals could notch out the occupied frequencies, thereby greatly reducing the interference. The penalty for this action is a signal loss of 1/7 or about 0.7 dB. With such a loss, the 12.5 dB SNR with respect to the first interference source would be reduced to just below 12 dB.

With respect to the third interference source (not shown in FIG. 6c), it noted that the navigation signal from base station #1 is 10 logG above a navigation signal from an adjacent base station. Considering the 43 dB spreading gain, the SNR of a weak navigation signal with respect to interference from a strong navigation signal is 43 dB-10logG. This leads to a good SNR even with G as large as 1000. This is a significant amount of differential gain variation which means that pseudorange measurements can be made to multiple base stations over most of the cellular area. The coverage can be further improved by addressing the problem of rear broadcasts interfering with a broadcast from a far base station. This can be accomplished in two ways: 1) multiple frequencies (3 at a minimum) can be for navigation signals and allocated so that no neighboring base stations broadcast at the same frequency, 2) navigation signals can be pulsed in coordination with adjacent base stations so that adjacent base stations do not broadcast simultaneously (e.g., in 3 second cycles in which 3 adjacent stations take turns with broadcasting of 1 second duration.

Figure 7:
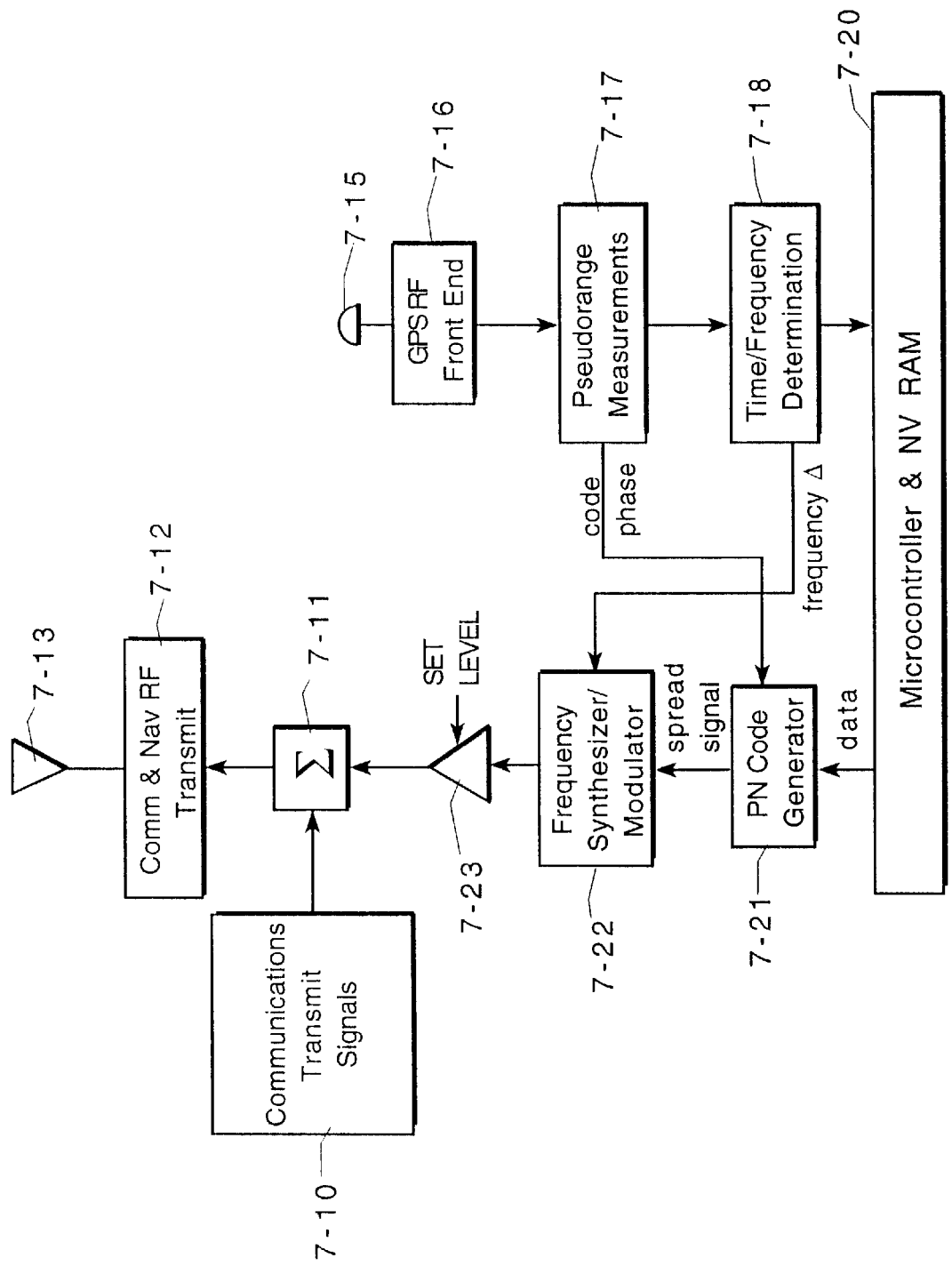
FIG. 7 is a block diagram of one configuration of a navigation signal generator embedded in a cellular base station.

Referring now to FIG. 7, the base station includes a source 7-10 of conventional base station communication transmit signals which are supplied via summer 7-11 to conventional base station transmitter 7-12 and broadcast on base station antenna 7-13 in the usual manner for any given cellular telephone system. The present invention embeds the CDMA navigation beacon discussed above under the communication signals at the base station. In this embodiment, a GPS antenna 7-15 supplies GPS signals to the conventional GPS RF front end 7-16 and conventional pseudorange computations in 7-17 and time/frequency determinations 7-18 provided to microcontroller 7-20, which has a non-volatile RAM. Data for that base station (such as station identity, location, etc. corresponding in general to data transmitted from a GPS satellite) from microcontroLler 7-20 are overlaid or spread with the PN code 7-12 (whose phase is controlled by a signal based on the pseudorange measurements). The spread signal is modulated in modulator 7-22 (which incorporates a frequency synthesizer which receives a control signal from time frequency circuit 7-18 of the GPS portion of the circuit so that the accurate GPS clock is used as a common time base for all of the base stations. According to the invention, the strength of the navigation signal is set so that the combined interference from a predetermined number N of navigation signals at any point is at least a predetermined level below the energy in the communication channel. In the embodiment illustrated in FIG. 7, the level is set by control amplifier 7-23. The controlled signal level of the navigation (location or position) signal is summed in summer 7-11 with the conventional base station communication signals and then processed and broadcast in the usual manner.

Description of System Operation

Figure 9:
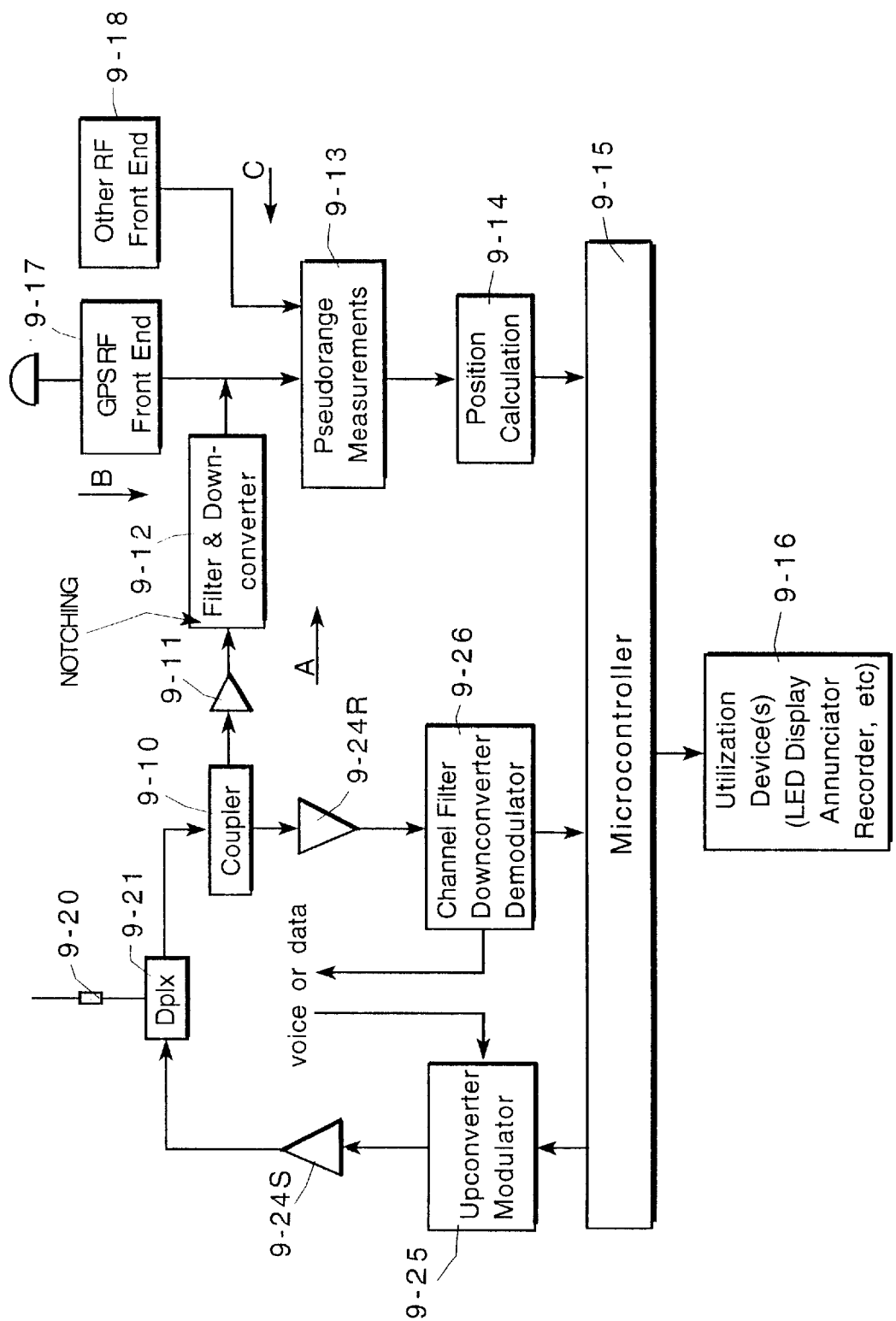
FIG. 9 is a block diagram of one embodiment of a communication terminal with universal position determination capability.

With the 3 system elements described above, a mobile or portable communications terminal will be able to determine its position at any location and in virtually any environment. FIG. 9 illustrates the logical block diagram of the most general terminal that would be used for position determination. The diplexer 9-21, amplifier 9-24S, 9-24R, modulator 9-25, demodulator 9-26 are conventional. Note that there are three potential RF paths into the terminal. Path A (from coupler 9-10, amplifier 9-11, and filter and downconverter 9-12) intercepts navigation signals that are embedded within the communication frequencies and pseudorange measurements made in 9-13 from which a position calculation 9-14 is made and provided to microcontroller 9-15, and utilization device 9-16, which may be a display (LCD or printed) a recorder, or a speaker. Path B includes GPS RF front end 9-17 which intercepts the navigation signals from the GPS satellites with an antenna and low-noise pre-amplifier in the RF front end. Path B could also receive transmissions of the RF Signposts as well, if on that frequency Finally, path C uses an RF path at an alternative frequency (e.g., 900 MHz ISM) to receive, either GPS-like signals or other Signpost signals at that frequency. Note that all three paths, A, B, and C have separate front ends, but share the middle and end stages of the GPS receiver that:

1) acquires and tracks the signals, thereby making the pseudorange measurements, and
2) demodulates and interprets the received data, and calculates the terminal position.

In regions where there are no RF navigation signals other than GPS, the terminal will determine its position via the GPS constellation. The GPS receiver has an interface with communications terminal so that position can be sent via a control channel or assigned channel of the communication system.

When the terminal is in a region where the communications system provides embedded navigation signals, the terminal receives these signals via the same antenna 9-20 and diplexer 9-21 as for communication signals. Some of the received signal power split off by coupler 9-10 at the receiver front end for the processing of the navigation signals. After filtering and downconversion 9-12 to a common IF, the received signal is routed to the Pseudorange Measurement stage 9-13 of the GPS receiver. Typically, the strongest signal will be acquired and demodulated first. Sometimes, as discussed above, when a mobile/portable is near the base station, the communications broadcast will jam the navigation signals from more distant base stations. However, the navigation signal from the same base station will always be strong enough to be demodulated. This signal will have data that identifies the occupied communication channels of the nearby base station. With this information, the receiver will implement a notch filter within the 2 MHz band of the navigation signal that will effectively eliminate the interference of the strong communications signals. In this manner, the receiver will be capable of simultaneously measuring the pseudorange to multiple stations, even when the receiver may be quite near a base station.

Finally, when the portable phone passes by or is near an RF Signpost, the signal will be received and demodulated along path C. Sometimes, the position may be also determined from multiple RF signals. For example, at an indoor location with a region served by a cellular communications system with navigation signals, the receiver will typically determine a position via pseudorange measurements. However, if the building contains RF Signposts, the receiver will also have a position of the last Signpost seen. This is advantageous for two reasons:

1) Multipath in the indoor environment will typically prevent position sufficiently accurate to determine the floor level.
2) Even if altitude was determined with sufficient accuracy, there may not be a database that maps the altitude/lat/lon coordinates into the floor level of a building address.

As described above, the Signpost data will contain an ID and other information that will map to a building address, floor number, or even suite.

As a prelude to establishing a communication connection, the communications terminal in FIG. 9 will make a positioning measurement as described. As part of the communications setup, the terminal will convey the position to the communications system (e.g., using the control/set-up channel in amps). Thus the communications system can route the call based on knowledge of position, and may also provide that position to the call destination. Once the call is connected, the communications terminal can also send the position to the call destination. With such position capabilities, the requirement of Enhanced 911 to know the position of a calling terminal is satisfied. These capabilities can also support the services of roadside assistance and fleet management via other special dialing codes. Finally, if positional information is embedded in all calls, this capability can also deter theft, fraud and abuse of wireless communications services.

The Invention Features the Following

1) The use of direct sequence spread spectrum (DSSS) waveform in a cellular coverage arrangement to provide terrestrial navigation to augment or replace GPS navigation.
2) The use of RF broadcasts (RF Signposts) that convey the location to a receiver using GPS-like or other digital RF waveform.
3) The reuse of communications frequencies of a cellular communications system to broadcast navigation beacons from the cell site base stations.
4) The level-setting technique for embedding the DSSS navigation beacon within the same band that is occupied by the communications frequencies so that the mutual interference between the communications signal and the navigation beacons are negligible.
5) The use of frequency notching within the navigation receiver to eliminate the interference caused by any narrow band communications broadcasts of the cellular communication system.
6) The use of navigation beacons at multiple frequencies to avoid near-far interference in a cellular array of navigation beacon. A 3 frequency system would be comprised of a center frequency and a frequency on either side offset by about 1 MHz (e.g. in the first null).
7) The use of time pulsing to avoid the near-far interference problem in an array of navigation beacons so that adjacent navigation beacons do not broadcast simultaneously, but coordinated in a time-division multiplexed scheme.
8) The integrated system composed of GPS, navigation beacon broadcasts in a cellular coverage, and RF Signpost broadcasts, that provide seamless positioning worldwide in outdoor and indoor environments.

It will be appreciated that the CDMA navigation or position information embedded in the communication signals of the wireless communications system can be used separately without any GPS channels and without the RF signpost feature.

While the invention and preferred embodiments have been shown and described, it will be appreciated that various other embodiments, modifications and adaptations of the invention will be readily apparent to those skilled in the art.

What is claimed is:

1. In a cellular array of navigation signal beacons having selected CDMA or GPS-like navigation signals, the method of avoiding near-far interference problems, comprising, pulsing the navigation signals from adjacent navigation signal beacons so that adjacent navigation beacons do not broadcast navigation signals simultaneously, and coordinating the broadcasts of the navigation signal beacons in a time-division multiplexed manner.

* * * * *